United States Patent
Park

(10) Patent No.: US 12,136,975 B2
(45) Date of Patent: Nov. 5, 2024

(54) AUDIO/VIDEO TRANSMITTING DEVICE AND WIRELESS DISPLAY SYSTEM

(71) Applicant: LG ELECTRONICS INC., Seoul (KR)

(72) Inventor: Gibaek Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/446,424

(22) PCT Filed: Aug. 6, 2021

(86) PCT No.: PCT/KR2021/010400
§ 371 (c)(1),
(2) Date: Aug. 30, 2021

(87) PCT Pub. No.: WO2023/013798
PCT Pub. Date: Feb. 9, 2023

(65) Prior Publication Data
US 2024/0056143 A1    Feb. 15, 2024

(51) Int. Cl.
*H04B 7/02* (2018.01)
*H04B 7/06* (2006.01)
*H04B 17/309* (2015.01)

(52) U.S. Cl.
CPC ......... *H04B 7/0608* (2013.01); *H04B 7/0693* (2013.01); *H04B 17/309* (2015.01)

(58) Field of Classification Search
CPC ... H04B 7/0608; H04B 17/309; H04B 7/0693
USPC .................. 375/267, 261, 260, 259
See application file for complete search history.

(56) References Cited

U.S. PATENT DOCUMENTS

| | | |
|---|---|---|
| 8,891,649 B2 | 11/2014 | Choi et al. |
| 9,521,531 B2 | 12/2016 | Mese |
| 10,182,396 B2 | 1/2019 | Kim et al. |
| 10,771,143 B1 | 9/2020 | Wen et al. |
| 11,251,540 B2 | 2/2022 | Kim et al. |

(Continued)

FOREIGN PATENT DOCUMENTS

| | | |
|---|---|---|
| CN | 107634789 | 1/2018 |
| CN | 110098857 | 8/2019 |

(Continued)

OTHER PUBLICATIONS

Australian Patent Office Application Serial No. 2021455532, Office Action dated Feb. 22, 2023, 3 pages.

(Continued)

*Primary Examiner* — Zewdu A Kassa
(74) *Attorney, Agent, or Firm* — LEE, HONG, DEGERMAN, KANG & WAIMEY

(57) ABSTRACT

An Audio/Video (A/V) transmitting device may include a Radio Frequency (RF) transmitting module configured to transmit a compressed RF packet to an RF receiving module of an A/V receiving device, the RF transmitting module including a plurality of transmitting antennas, and a processor configured to obtain radio performance between the RF transmitting module and the RF receiving module and, when the obtained radio performance satisfies a preset radio performance, sequentially turn off one or more transmitting antennas among the plurality of transmitting antennas.

13 Claims, 9 Drawing Sheets

(56) References Cited

U.S. PATENT DOCUMENTS

| | | |
|---|---|---|
| 2005/0289606 A1 | 12/2005 | Tsumura |
| 2007/0224951 A1 | 9/2007 | Gilb et al. |
| 2008/0122706 A1 | 5/2008 | Jalali |
| 2011/0249715 A1 | 10/2011 | Choi et al. |
| 2011/0250926 A1 | 10/2011 | Wietfeldt et al. |
| 2013/0136001 A1 | 5/2013 | Mese |
| 2013/0222515 A1* | 8/2013 | Abuan .................. H04L 45/306 348/14.01 |
| 2015/0208345 A1 | 7/2015 | Weissman et al. |
| 2015/0334245 A1* | 11/2015 | Lin ........................ H04W 4/80 370/261 |
| 2016/0365909 A1 | 12/2016 | Kim et al. |
| 2020/0205087 A1 | 6/2020 | Hong |
| 2021/0250940 A1* | 8/2021 | Raghavan ................ H01Q 3/28 |

FOREIGN PATENT DOCUMENTS

| | | |
|---|---|---|
| JP | 2006080910 | 3/2006 |
| JP | 2006129247 | 5/2006 |
| JP | 2008067161 | 3/2008 |
| JP | 2013179383 | 9/2013 |
| JP | 2022-502028 | 1/2022 |
| KR | 1020100124422 | 11/2010 |
| KR | 1020110114175 | 10/2011 |
| KR | 1020130061119 | 6/2013 |
| KR | 101517170 | 4/2015 |
| KR | 101537644 | 7/2015 |
| WO | 2017175964 | 10/2017 |

OTHER PUBLICATIONS

Japan Patent Office Application No. 2022-502028, Office Action dated Oct. 3, 2023, 3 pages.
Korean Intellectual Property Office Application Serial No. 10-2022-7023032, Notice of Allowance dated Jun. 30, 2023, 7 pages.
PCT International Application No. PCT/KR2021/010400, International Search Report dated Apr. 21, 2022, 3 pages.
European Patent Office Application Serial No. 22152222.0, Search Report dated Apr. 7, 2022, 4 pages.
Japan Patent Office Application No. 2022-502028, Notice of Allowance dated Mar. 19, 2024, 2 pages.
The State Intellectual Property Office of the People's Republic of China Application Serial No. 202180005062.X, Office Action dated Jun. 1, 2024, 7 pages.

* cited by examiner

AUDIO/VIDEO TRANSMITTING DEVICE AND WIRELESS DISPLAY SYSTEM

CROSS-REFERENCE TO RELATED APPLICATIONS

Pursuant to 35 U.S.C. § 119, this application claims the benefit of an earlier filing date and right of priority to International Application No. PCT/KR2021/010400, filed on Aug. 6, 2021, the contents of which are hereby incorporated by reference herein in its entirety.

BACKGROUND OF THE INVENTION

Field of the Invention

The present disclosure relates to a wireless display system for wirelessly transmitting and receiving A/V data.

Discussion of the Related Art

As image technology changes from analog to digital, development has been made from SD (Standard-Definition) to HD (Hi-Definition) to provide images closer to a real scene. SD supports a resolution of 704×480 and consists of about 350,000 pixels. HD is classified into HD and Full HD. Among them, Full HD supports a resolution of 1920×1080 and consists of 2 million pixels to provide a significantly higher quality image compared to SD.

Recent image technology is growing one step further to Ultra High-Definition (UHD) beyond Full HD. UHD, which supports high image quality and ultra-high resolution, is spotlighted as a next-generation media environment. The UHD supports 4K (3840×2160) and 8K (7680×4320) resolutions and surround audio of up to 22.2 channels. Compared to the HD, the UHD provides 4 times higher picture quality than the 4K UHD, and the 8K UHD provides 16 times higher picture quality than the HD.

Recently, a wireless display system that wirelessly transmits such a high-resolution image to a display device has emerged.

The wireless display system is a system for transmitting and receiving A/V data between an A/V transmitting device and an A/V receiving device through a local area network.

The A/V receiving device displays A/V data received from the A/V transmitting device.

Since A/V data is transmitted through an antenna in the wireless display system, it is an important task to prevent power consumption.

Conventionally, in order to reduce power consumption, the amount of transmitted data may be changed through an increase in a compression ratio, or power may be indirectly reduced through a decrease in luminance.

However, the conventional technique indirectly reduces set power consumption by adjusting the amount of data or lowering screen brightness to provide additional deterioration factors such as loss in image quality for the user, causing a problem in which power consumption of a wireless communication device itself cannot be lowered.

SUMMARY OF THE INVENTION

An object of the present disclosure is to reduce power consumption caused by an antenna according to an environment between a transmitting device and a receiving device in a wireless display system.

An object of the present disclosure is to prevent unnecessary power consumption of an antenna when wireless performance is maintained in a wireless display system.

According to an embodiment of the present disclosure, an Audio/Video (A/V) transmitting device may include a Radio Frequency (RF) transmitting module configured to transmit a compressed RF packet to an RF receiving module of an A/V receiving device, the RF transmitting module including a plurality of transmitting antennas, and a processor configured to obtain radio performance between the RF transmitting module and the RF receiving module and, when the obtained radio performance satisfies a preset radio performance, sequentially turn off one or more transmitting antennas among the plurality of transmitting antennas.

According to another embodiment of the present disclosure, a wireless display system may include an Audio/Video (A/V) transmitting device including a Radio Frequency (RF) transmitting module including a plurality of transmitting antennas, and an A/V receiving device configured to measure radio performance between the RF transmitting module and the RF receiving module and transmit the measured radio performance to the A/V transmitting device, wherein, when the received radio performance satisfies a preset radio performance, the A/V transmitting device sequentially turns off one or more transmitting antennas among the plurality of transmitting antennas.

According to an embodiment of the present disclosure, the number of activated antennas is adjusted according to radio performance between the transmitter and the receiver, thereby preventing power consumption.

In addition, according to an embodiment of the present disclosure, when radio performance of the transmitter and the receiver is maintained as the reference radio performance, the number of activated antennas is minimized, thereby preventing unnecessary power consumption.

DETAILED DESCRIPTION OF THE PREFERRED EMBODIMENTS

Hereinafter, embodiments of the present disclosure will be described in detail with reference to the drawings. The suffixes "module" and "unit or portion" for components used in the following description are merely provided only for facilitation of preparing this specification, and thus they are not granted a specific meaning or function.

An audio/video (hereinafter, A/V) transmitting device according to an embodiment of the present disclosure is, for example, an intelligent device in which a computer support function is added to a broadcast reception function. The A/V transmitting device may perform the Internet function in addition to the broadcast reception function and may be equipped with a more user-friendly interface such as a handwritten input device, a touch screen or a spatial remote control device.

In addition, the A/V transmitting device may be connected to the Internet and a computer with the support of a wired or wireless Internet function and therefore, also perform functions such as e-mail, web browsing, banking, or games. A standardized general-purpose OS may be used for these various functions.

Accordingly, in the A/V transmitting device described in the present disclosure, for example, various applications may be freely added or deleted on a general-purpose OS kernel, so that various user-friendly functions may be performed.

Figure 1:
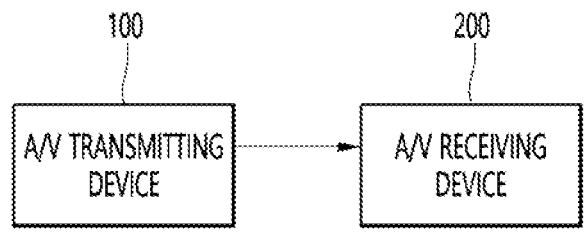
FIGS. 1 and 2 are diagrams for describing a configuration of a display system according to an embodiment of the present disclosure.
Figure 2:
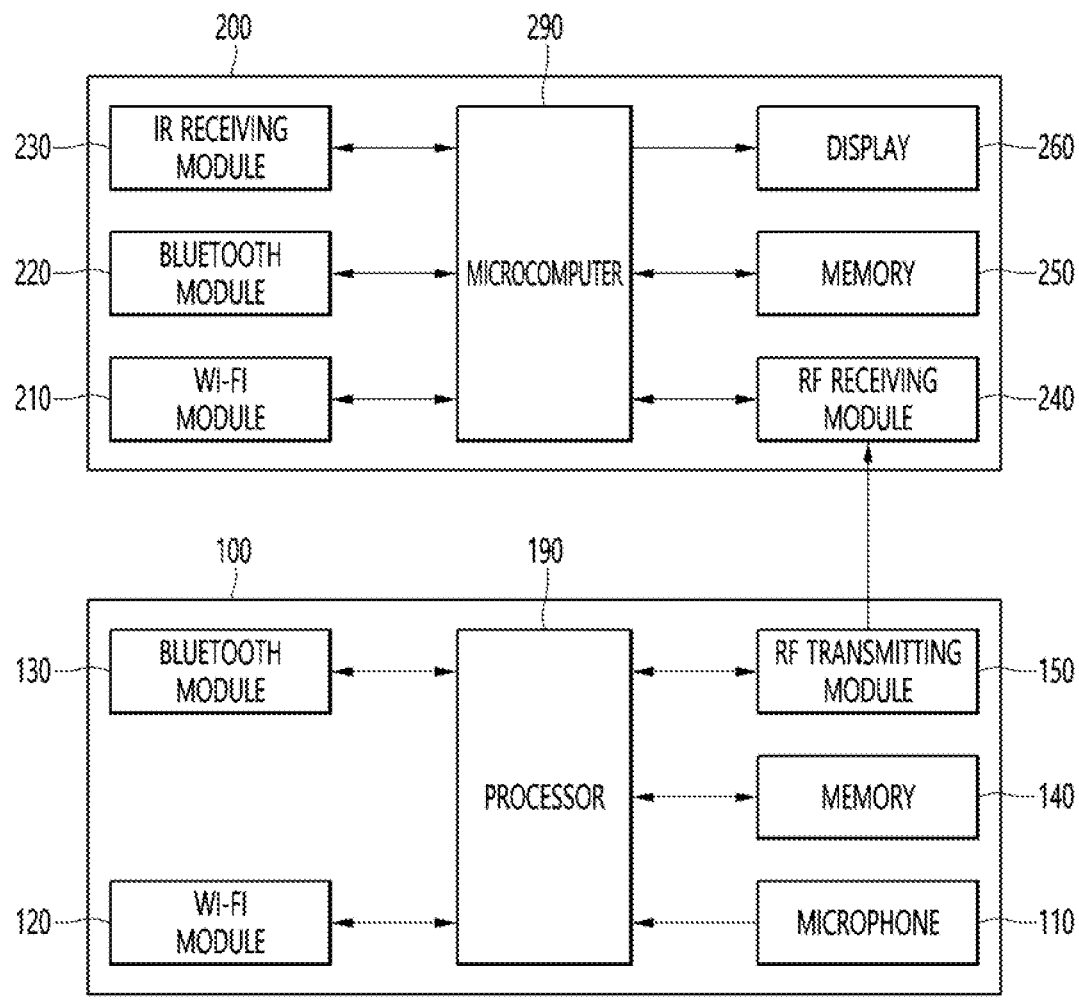

FIGS. 1 and 2 are diagrams for describing a configuration of a wireless display system according to an embodiment of the present disclosure.

Referring to FIG. 1, a wireless display system 1 according to an embodiment of the present disclosure may include an A/V transmitting device 100 and an A/V receiving device 200.

The wireless display system 1 may be a system in which the A/V transmitting device 100 wirelessly transmits A/V data to the A/V receiving device 200, and the A/V receiving device 200 outputs the A/V data.

The A/V transmitting device 100 may be a device capable of encoding video and audio and transmitting the encoded content video and audio in a wireless manner.

The A/V transmitting device 100 may be a set-top box.

The A/V transmitting device 100 may be connected to an external device such as a set-top box or a USB memory. The A/V transmitting device 100 may transmit a video signal or an audio signal received from the connected external device to the A/V receiving device 200.

The A/V receiving device 200 may be a display device capable of wirelessly receiving an encoded video and audio and decoding the received video and audio.

The A/V transmitting device 100 and the A/V receiving device 200 may constitute a video wall display system.

In a video wall, a display having a thin bezel plays an important role in the visualization of content images. For a thin bezel of a display, it is efficient that components capable of minimal functions are only provided and a circuit or a component for a main function is provided in a separate device.

The A/V transmitting device 100 may determine a type of the content video input from the outside and determine a compression radio of the content video based on the determined type. The compression rate of the content video may be defined as a ratio between the size of video data before encoding and the size of video data after encoding.

The type of the content image may include a still image type, a general video type, and a game video type.

The A/V transmitting device 100 may compress the content video according to the determined compression ratio, and wirelessly transmit the compressed content video to the A/V receiving device 200.

The A/V receiving device 200 may restore the compressed content video received from the A/V transmitting device 100 and display the restored content video on the display.

FIG. 2 is a block diagram illustrating detailed configurations of the A/V transmitting device 100 and the A/V receiving device 200.

Referring to FIG. 2, the A/V transmitting device 100 may include a microphone 110, a Wi-Fi module 120, a Bluetooth module 130, a memory 140, an RF transmitting module 150, and a processor 190.

The microphone 110 may receive an audio signal and transmit the audio signal to the processor 190.

The microphone 110 may receive a speech uttered by a user.

The Wi-Fi module 120 may perform wireless communication through the Wi-Fi standard. The Wi-Fi module 120 may perform wireless communication with an external device or the A/V receiving device 200 through the Wi-Fi standard.

The Bluetooth module 130 may perform wireless communication through a Bluetooth Low Energy (BLE) standard.

The Bluetooth module 130 may perform wireless communication with an external device such as a remote control device or the A/V receiving device 200 through a Bluetooth Low Energy (BLE) standard.

The memory 140 may store a program for signal processing and control and store a signal-processed video, audio, or data signal.

The memory 140 may perform a function for temporarily storing video, audio, or data signals input from the outside, and store information on a predetermined image through a channel storage function.

The RF transmitting module 150 may transmit an A/V signal to the RF receiving module 240 of the A/V receiving device 200 through radio frequency (RF) communication.

The RF transmitting module 150 may include one or more antennas.

The RF transmitting module 150 may transmit a compressed A/V signal in a digital form to the RF receiving module 240.

The RF transmitting module 150 may transmit an A/V signal to the RF receiving module 240 through one or more channels.

The processor 190 may control overall operation of the A/V transmitting device 100. The processor 190 may be configured in the form of a system on chip (SoC).

A plurality of processors 190 may be provided.

The processor 190 may compress a video signal or an audio signal input from the outside, and transmit the compressed signal to the RF transmitting module 150.

The processor 190 may include an encoder for compressing a video signal or an audio signal.

The processor 190 may be referred to as a main SoC.

The processor 190 may include one or more interfaces for connection with an external device. For example, the processor 190 may include one or more HDMI ports and one or more USB ports.

The processor 190 may include a tuner for receiving a broadcast signal.

The A/V receiving device 200 may include a Wi-Fi module 210, a Bluetooth module 220, an IR module 230, an RF receiving module 240, a memory 250, a display 260, and a microcomputer 290.

The Wi-Fi module 210 may perform wireless communication through the Wi-Fi standard.

The Wi-Fi module 120 may perform wireless communication with an external device or the A/V transmitting device 100 through a Wi-Fi standard.

The Bluetooth module 130 may perform wireless communication through a Bluetooth Low Energy (BLE) standard.

The Bluetooth module 220 may perform wireless communication with an external device such as a remote control device or the A/V transmitting device 100 through a Bluetooth Low Energy (BLE) standard.

The IR module 230 may receive a signal from the remote control device 300 to be described later through IR (Infrared) communication.

The RF receiving module 240 may receive an A/V signal from the RF transmitting module 150.

The RF receiving module 240 may include a plurality of antennas. The RF receiving module 240 may be disposed at the lower end of the display 260.

The RF receiving module 240 may include a first antenna module and a second antenna module. Each of the first antenna module and the second antenna module may include a plurality of antennas.

The RF receiving module 240 may receive a compressed A/V signal in digital form from the RF transmitting module 150 and transmit the received A/V signal to the microcomputer 290.

The memory 250 may store a program for signal processing and control and store a signal-processed video, audio, or data signal.

The display 260 may display a video signal received from the microcomputer 290.

The display 260 may display the video signal according to driving of a timing controller (not shown).

The microcomputer 290 may control the overall operation of the A/V receiving device 200.

The microcomputer 290 may restore the compressed A/V signal received by the RF receiving module 240. To this end, the microcomputer 290 may include a decoder.

Figure 3:
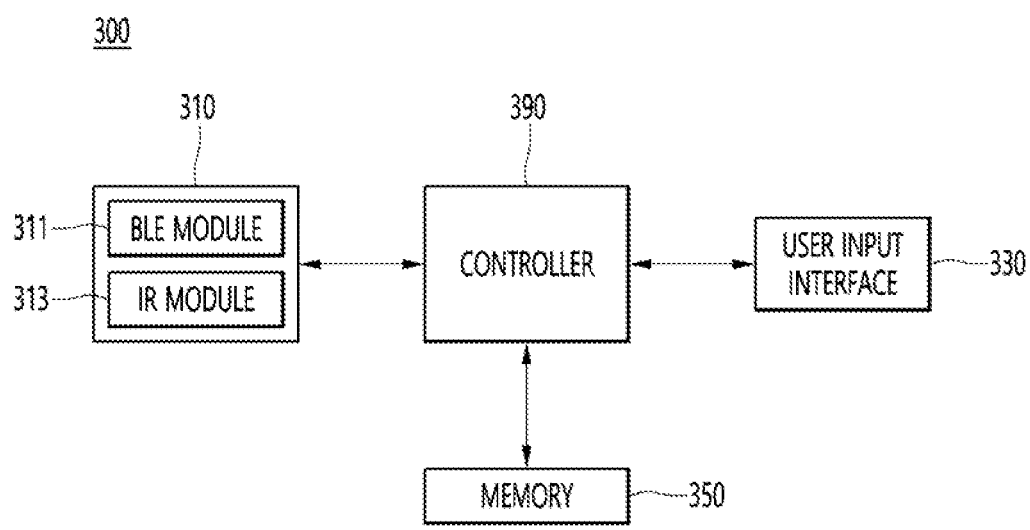
FIG. 3 is a block diagram for describing a configuration of a remote control device according to an embodiment of the present disclosure.

FIG. 3 is a block diagram for describing a configuration of a remote control device according to an embodiment of the present disclosure.

Referring to FIG. 3, a remote control device 300 may include a wireless communication interface 310, a user input interface 330, a memory 350, and a controller 390.

The wireless communication interface 310 may be an interface for performing wireless communication with the A/V transmitting device 100 or the A/V receiving device 200.

The wireless communication interface 310 may include a Bluetooth Low Energy (BLE) module 311 and an IR (Infra-Red) module 313.

The BLE module 311 may transmit a signal for controlling the operation of the A/V transmitting device 100 to the A/V transmitting device 100.

The BLE module 311 may transmit a signal for triggering a pairing operation of the A/V transmitting device 100 to the A/V transmitting device 100.

The user input interface 330 may include a keypad, a button, a touch pad, a touch screen, or the like.

The user input interface 330 may generate a control command for controlling the operation of the A/V transmitting device 100 or the A/V receiving device 200 according to a user's operation command.

When the user input interface 330 includes a hard key button, the user may operate the hard key through an operation of pushing the hard key button.

The user input interface 330 may include various types of input means that can be operated by the user, such as a scroll key or a jog key.

The memory 350 may store a program for the operation of the controller 390 and may temporarily store input/output data.

The controller 390 may control operation related to an application program and generally control overall operation of the remote control device 300.

Figure 4:
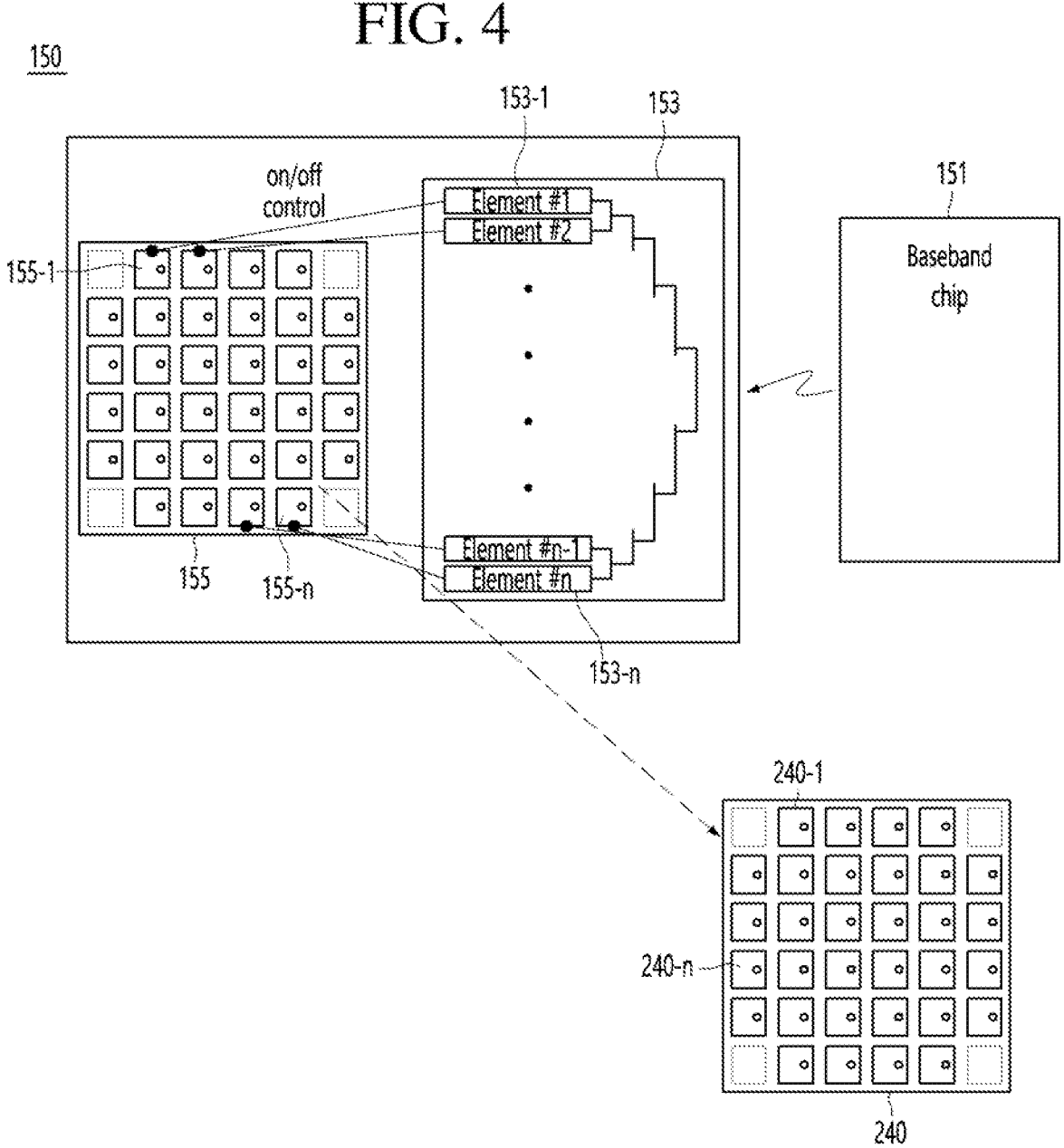
FIG. 4 is a diagram for describing a configuration of an RF transmitting module and an RF receiving module according to an embodiment of the present disclosure.

FIG. 4 is a diagram for describing a configuration of an RF transmitting module and an RF receiving module according to an embodiment of the present disclosure.

Referring to FIG. 4, the RF transmitting module 150 included in the A/V transmitting device 100 may include a baseband chip 151, an RF IC chip 153, and a transmitting antenna module 155.

In another embodiment, the baseband chip 151 may be included in the processor 190. In this case, the RF transmitting module 150 may include only the RF IC chip 153 and the transmitting antenna module 155.

The baseband chip 151 may transmit a control signal for controlling the operation of the RF IC chip 153.

The baseband chip 151 may transmit a control signal for controlling the operation of the antenna to the RF IC chip 153.

The baseband chip 151 may transmit a control signal to the RF IC chip 153 through a coaxial cable.

The RF transmitting module 150 may include only the RF IC chip 153 and the transmitting antenna module 155.

The RF IC chip 153 may include a plurality of RF IC elements 153-1 to 153-$n$ respectively corresponding to a plurality of transmitting antennas 155-1 to 155-$n$, which will be described later.

The plurality of RF IC elements 153-1 to 153-$n$ may transmit an on control signal or an off control signal to the plurality of transmitting antennas 155-1 to 155-$n$, respectively.

That is, RF IC circuits may transmit an on control signal for turning on the corresponding transmitting antenna or an off signal for turning off the corresponding transmitting antenna.

The transmitting antenna may be turned on according to the on control signal received from the corresponding RF IC circuit, or may be turned off according to the off control signal received from the corresponding RF IC circuit.

When the antenna is turned on, it may be a state in which power for transmitting A/V data is supplied.

When the antenna is turned off, it may be a state in which the supply of power for transmitting A/V data is cut off.

The transmitting antenna module 155 may include a plurality of transmitting antennas 155-1 to 155-$n$.

The transmitting antenna module 155 may include 32 transmitting antennas, but this is only an example. The 32 transmitting antennas may be arranged in a matrix structure.

The transmitting antenna module 155 may wirelessly transmit the compressed A/V signal to the RF receiving module 240.

As the number of turned-on antennas increases, the intensity of transmission power consumed for A/V data transmission may increase.

As the number of turned-off antennas increases, the intensity of transmission power consumed for A/V data transmission may decrease.

That is, the number of turned-on antennas may be associated with the intensity of transmission power for A/V data.

The baseband chip 151 may determine an antenna to be turned on, based on a wireless environment. The wireless environment may vary depending on the distance between the A/V transmitting device 100 and the A/V receiving device 200, an angle between the A/V transmitting device 100 and the A/V receiving device 200, and the presence or absence of an obstacle.

The baseband chip 151 may determine an transmitting antenna to be turned on according to the radio performance between the A/V transmitting device 100 and the A/V receiving device 200.

This will be described in detail later.

Figure 5:
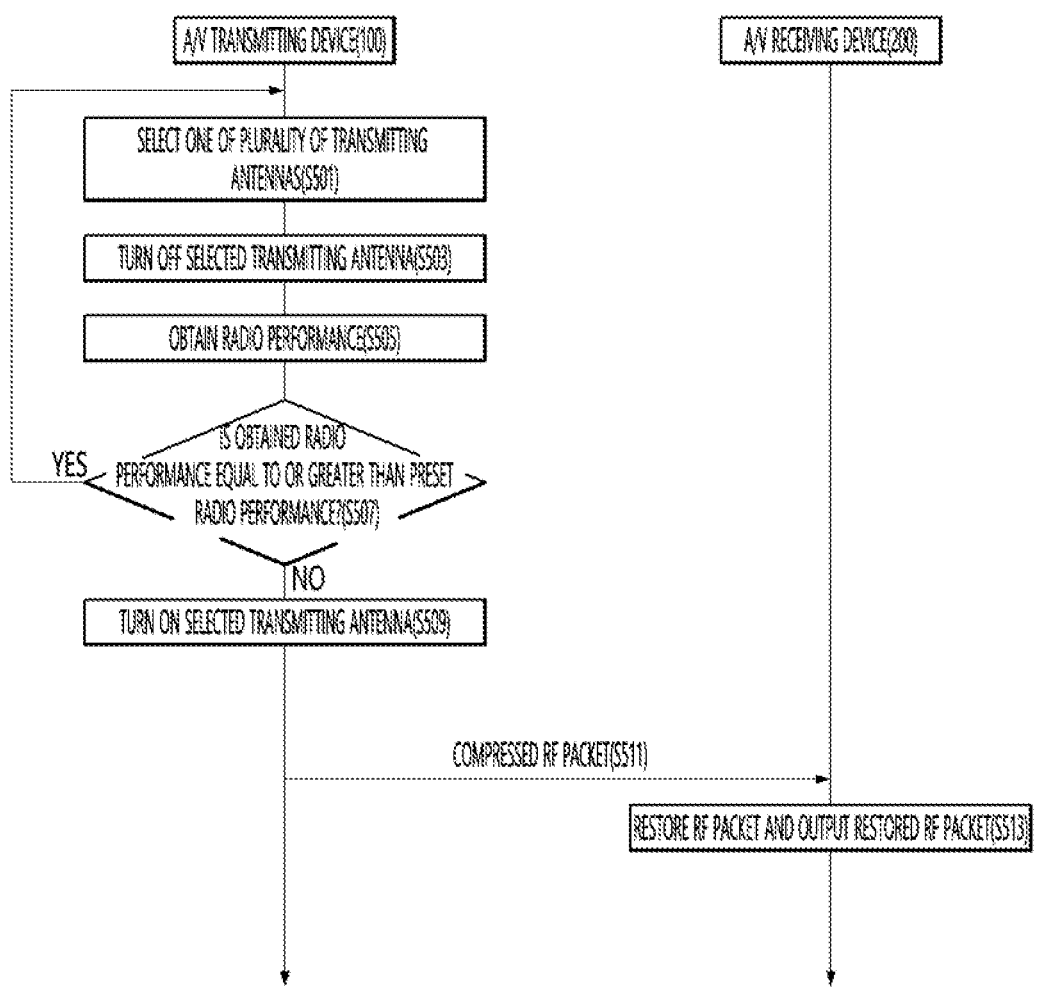
FIG. 5 is a ladder diagram for describing a method of operating a wireless display system according to an embodiment of the present disclosure.

FIG. 5 is a ladder diagram for describing a method of operating a wireless display system according to an embodiment of the present disclosure.

Hereinafter, a method of operating a wireless display system will be described with reference to the embodiments of FIGS. 1 to 4.

Referring to FIG. 5, the processor 190 of the A/V transmitting device 100 selects one of the plurality of transmitting antennas 155-1 to 155-*n* (S501).

In an embodiment, the processor 190 may select a transmitting antenna to be turned off among the plurality of transmitting antennas 155-1 to 155-*n*.

The processor 190 may select a transmitting antenna to be turned off, based on the distance between the RF transmitting module 150 and the RF receiving module 240 and/or the angle between the RF transmitting module 150 and the RF receiving module 240.

The processor 190 may select a transmitting antenna that will not affect radio performance. Not affecting radio performance (or wireless performance) may mean that delay or omission does not occur in the process of transmitting A/V data.

In step S501, a case in which one transmitting antenna is turned off has been described, but this is only an example. When the plurality of transmitting antennas 155-1 to 155-*n* are divided into a predetermined number of groups, one group may be turned off.

The process of selecting the transmitting antenna to be turned off among the plurality of transmitting antennas 155-1 to 155-*n* will be described with reference to FIG. 6.

Figure 6:
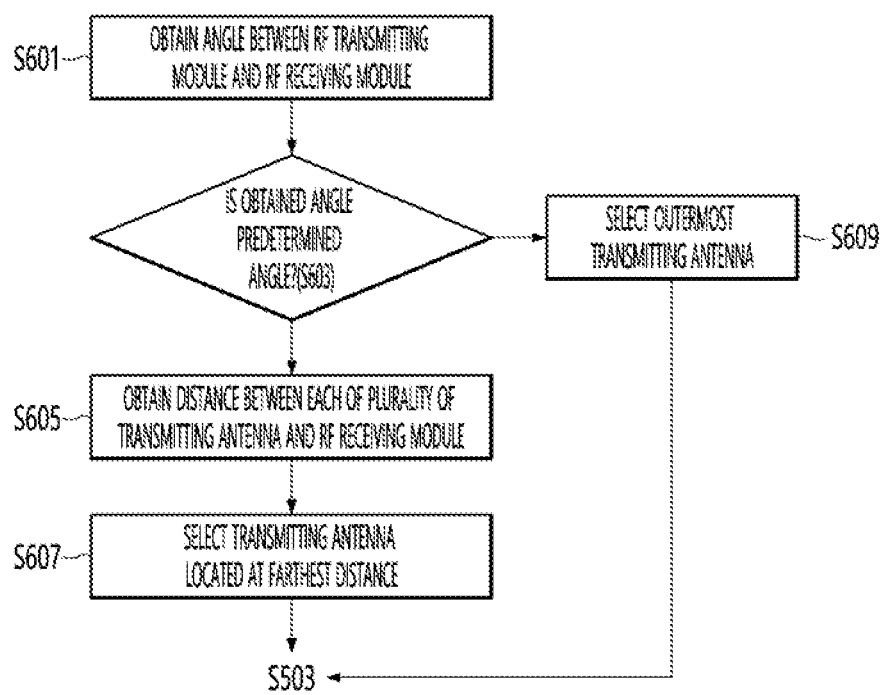
FIG. 6 is a flowchart for describing a process of selecting a transmitting antenna to be turned off among a plurality of transmitting antennas included in an RF transmitting module, according to an embodiment of the present disclosure.

FIG. 6 is a flowchart for describing a process of selecting a transmitting antenna to be turned off among a plurality of transmission antennas included in an RF transmitting module, according to an embodiment of the present disclosure.

Referring to FIG. 6, the processor 190 of the A/V transmitting device 100 obtains the angle between the RF transmitting module 150 and the RF receiving module 240 (S601).

The processor 190 may measure an angle of a beam transmitted from the RF transmitting module 150 to the RF receiving module 240. Specifically, the processor 190 may measure the angle of the beam transmitted to the RF receiving module 240 by one transmitting antenna included in the RF transmitting module 150.

The processor 190 may obtain the measured angle of the beam as the angle between the RF transmitting module 150 and the RF receiving module 240.

In another embodiment, the microcomputer 290 of the A/V receiving device 200 may measure the angle of the beam received from the RF transmitting module 150 by the RF receiving module 240. The microcomputer 290 may transmit the measured angle of the beam to the A/V transmitting device 100.

The microcomputer 290 may transmit the measured angle of the beam to the A/V transmitting device 100 through the Bluetooth module 220, the Wi-Fi module 210, and the RF receiving module 240.

The processor 190 of the A/V transmitting device 100 determines whether the obtained angle is a predetermined angle (S603).

In an embodiment, the predetermined angle may be 0 degrees, but this is only an example. The predetermined angle may be an angle in a predetermined range greater than 0 degrees. The predetermined angle may be a magnitude in a predetermined range.

Figure 7:
FIGS. 7 and 8 are diagrams for describing an angle between an RF transmitting module and an RF receiving module according to an embodiment of the present disclosure.
Figure 8:
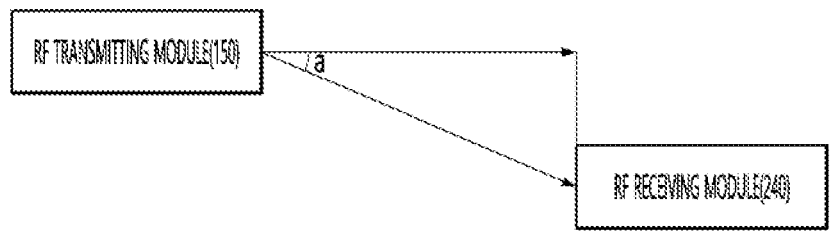

FIGS. 7 and 8 are diagrams for describing an angle between an RF transmitting module and an RF receiving module according to an embodiment of the present disclosure.

FIG. 7 shows a case in which the angle between the RF transmitting module 150 and the RF receiving module 240 is 0 degrees, and FIG. 8 shows a case in which the angle between the RF transmitting module 150 and the RF receiving module 240 is "a" degrees greater than 0 degrees.

The A/V transmitting device 100 may obtain the angle of the beam transmitted to the RF receiving module 240 by the RF transmitting module 150 as the angle between the RF transmitting module and the RF receiving module.

Again, FIG. 6 is described.

When the obtained angle is not a predetermined angle, the processor 190 of the A/V transmitting device 100 obtains the distance between each of the plurality of transmitting antennas 155-1 to 155-*n* and the RF receiving module 240 (S605).

When the obtained angle is not a predetermined angle, the processor 190 obtains the distance between each of the plurality of transmitting antennas 155-1 to 155-*n* and one receiving antenna included in the RF receiving module 240.

The receiving antenna included in the RF receiving module 240, which is the reference for distance measurement, is an antenna located at the center of the plurality of receiving antennas 240-1 to 240-*n* of the matrix structure included in the RF receiving module 240. The antenna located at the center may be referred to as a reference receiving antenna.

The processor 190 may control the plurality of transmitting antennas 155-1 to 155-*n* to sequentially transmit a beam to the reference receiving antenna. The processor 190 may have previously stored the speed of the transmitted beam.

The processor 190 may measure the time until the beam transmitted by each transmitting antenna returns to the transmitting antenna itself through the reference receiving antenna.

The processor 190 may measure the distance between each transmitting antenna and the reference receiving antenna by dividing the beam speed by the measured time.

The processor 190 of the A/V transmitting device 100 selects a transmitting antenna located at the furthest distance among the plurality of obtained distances as an antenna to be turned off (S607).

Figure 9:
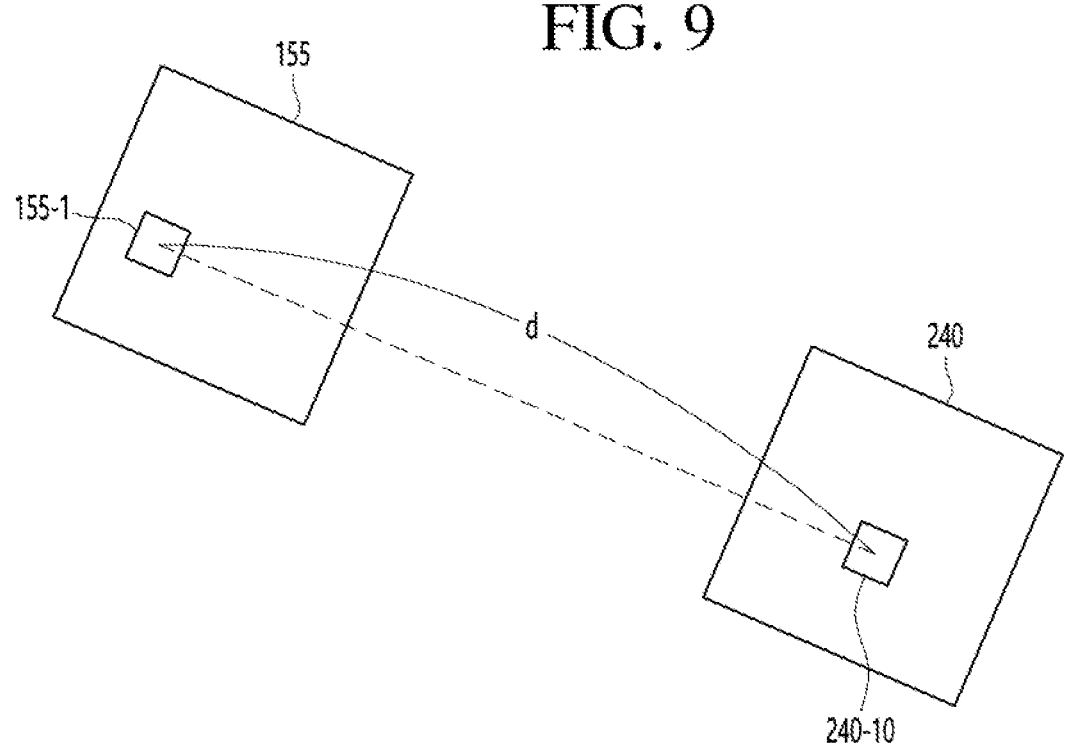
FIG. 9 is a diagram illustrating a process of selecting a transmitting antenna farthest from a reference receiving antenna among a plurality of transmitting antennas, according to an embodiment of the present disclosure.

FIG. 9 is a diagram illustrating a process of selecting a transmitting antenna farthest from a reference receiving antenna among a plurality of transmitting antennas, according to an embodiment of the present disclosure.

Referring to FIG. 9, it is assumed that a distance d between the first transmitting antenna 155-1 included in the RF transmitting antenna module 155 and the reference receiving antenna 240-10 included in the RF receiving module 240 is the greatest.

The processor 190 may select the first transmitting antenna 155-1 as an antenna to be turned off.

Again, FIG. 6 is described.

On the other hand, when the obtained angle is 0 degrees, the processor 190 of the A/V transmitting device 100 selects the outermost transmitting antenna among the plurality of transmitting antennas 155-1 to 155-n as an antenna to be turned off (S609).

The processor 190 may select, as an antenna to be turned off, one transmitting antenna surrounding the periphery among the plurality of transmitting antennas 155-1 to 155-n having the matrix structure.

This will be described in detail later.

Again, FIG. 5 is described.

The processor 190 of the A/V transmitting device 100 turns off the selected transmitting antenna (S503).

The processor 190 may not supply power to the selected transmitting antenna. Accordingly, the selected antenna may be turned off.

Specifically, the baseband chip 151 may transmit a power-off signal to the RF IC element corresponding to the selected transmitting antenna. The corresponding RF IC element may turn off the matched transmitting antenna according to the received power-off signal. The RF IC element may cut off the supply of power to the matched transmitting antenna according to the received power-off signal.

After the processor 190 of the A/V transmitting device 100 turns off the selected transmitting antenna, the processor 190 obtains radio performance between the RF transmitting module 150 and the RF receiving module 240 (S505).

In an embodiment, the radio performance may be a Received Signal Strength Indicator (RSSI) and/or a Signal-to-Noise (SNR).

The microcomputer 290 of the A/V receiving device 200 may measure RSSI of a signal received from the RF transmitting module 150 and transmit the measured RSSI to the A/V transmitting device 100.

The microcomputer 290 may feed back the measured RSSI to the A/V transmitting device 100 through the RF receiving module 240.

The microcomputer 290 of the A/V receiving device 200 may measure the SNR based on the signal received from the RF transmitting module 150. The microcomputer 290 may obtain the SNR by measuring power of a signal relative to power of a noise signal.

The microcomputer 290 may feed back the measured SNR to the A/V transmitting device 100 through the RF receiving module 240.

The processor 190 of the A/V transmitting device 100 determines whether the obtained radio performance is equal to or greater than a preset radio performance (S507).

In an embodiment, when the RSSI is equal to or greater than a first preset value, the processor 190 may determine that the radio performance is equal to or greater than the preset radio performance.

In another embodiment, when the SNR is equal to or greater than a second preset value, the processor 190 may determine that the radio performance is equal to or greater than the preset radio performance.

In another embodiment, when the RSSI is equal to or greater than the first preset value and the SNR is equal to or greater than the second preset value, the processor 190 may determine that the radio performance is equal to or greater than the preset radio performance.

In an embodiment, when the RSSI is less than the first preset value, the processor 190 may determine that the radio performance is less than the preset radio performance.

In another embodiment, when the SNR is less than the second preset value, the processor 190 may determine that the radio performance is less than the preset radio performance.

In another embodiment, when the RSSI is less than the first preset value and the SNR is less than the second preset value, the processor 190 may determine that the radio performance is less than the preset radio performance.

When the processor 190 of the A/V transmitting device 100 determines that the obtained radio performance is less than the preset radio performance, the processor 190 of the A/V transmitting device 100 turns on the selected transmitting antenna (S509).

In this case, the processor 190 may control the turned-off transmit antenna to be turned on again in order to obtain a normal data rate.

The processor 190 of the A/V transmitting device 100 transmits the compressed RF packet to the RF receiving module 240 of the A/V receiving device 200 through the RF transmitting module 150 (S511).

The microcomputer 290 of the A/V receiving device 200 restores the compressed RF packet and outputs the restored A/V data (S513).

On the other hand, the processor 190 of the A/V transmitting device 100 may perform step S501 when the obtained radio performance is equal to or greater than the preset radio performance.

That is, the processor 190 may turn off the preselected transmitting antenna and then select another transmitting antenna to be turned off.

The processor 190 may sequentially turn off the transmitting antennas to determine whether the radio performance satisfies the preset radio performance. This is because, even when a predetermined number of transmitting antennas are turned off, if the radio performance is maintained, power can be saved according to the turn-off of the transmitting antennas.

In an embodiment, the processor 190 may select a transmitting antenna closest to the preselected transmitting antenna.

In another embodiment, the processor 190 may select a transmitting antenna corresponding to the greatest distance among the distances excluding the distance between the preselected transmitting antenna and the reference receiving antenna.

Figure 10:
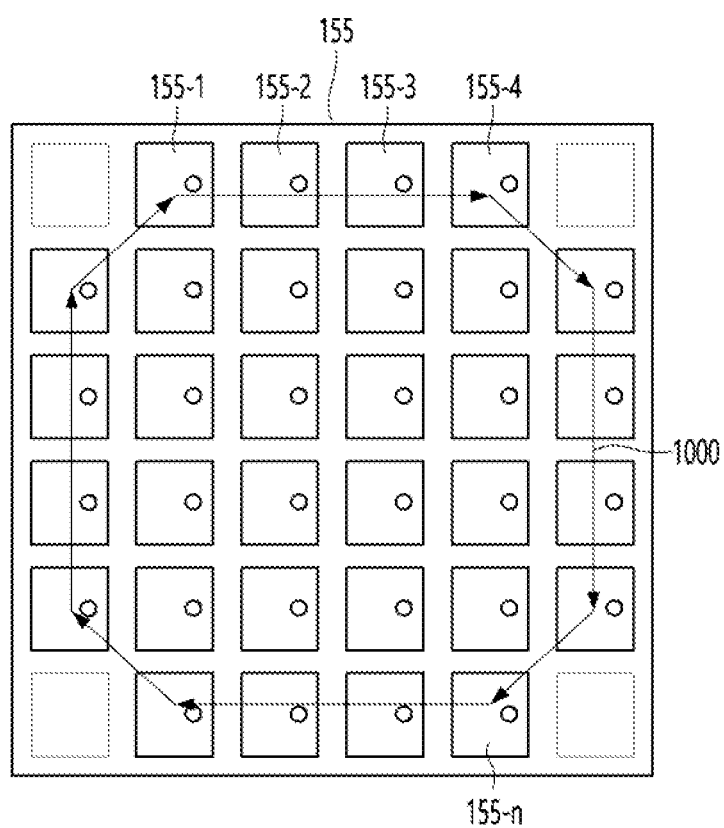
FIGS. 10 and 11 are diagrams for describing a process of sequentially turning off a transmitting antenna when an angle between an RF transmitting module and an RF receiving module is a predetermined angle, according to an embodiment of the present disclosure.
Figure 11:
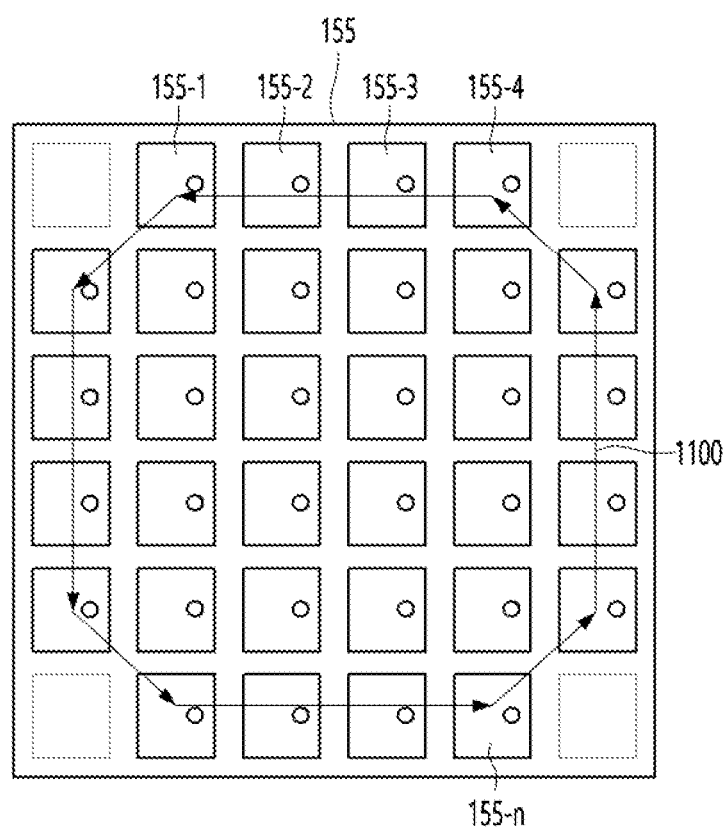

FIGS. 10 and 11 are diagrams for describing a process of sequentially turning off a transmitting antenna when an angle between an RF transmitting module and an RF receiving module is a predetermined angle, according to an embodiment of the present disclosure.

Referring to FIGS. 10 and 11, the RF transmitting antenna module 155 having a matrix structure is shown.

The number of transmitting antennas included in the RF transmitting antenna module 155 may be 32, but this is only an example.

The transmitting antennas arranged in each row may be arranged at regular intervals.

The transmitting antennas arranged in each column may be arranged at regular intervals.

Each of the transmitting antennas may have a rectangular shape, but this is only an example.

When the angle between the RF transmitting module 150 and the RF receiving module 240 is a predetermined angle (e.g., 0 degrees), the processor 190 of the A/V transmitting device 100 may select one of the antennas arranged along a first antenna path 1000 among the plurality of transmitting antennas 155-1 to 155-*n*.

For example, the processor 190 may select the first transmitting antenna 155-1 in a first antenna path 1000 of a clockwise direction as an antenna to be turned off. However, this is only an example, and one antenna located along the first antenna path 1000 may be selected as the transmitting antenna.

The processor 190 may turn off the first transmitting antenna 155-1 and obtain radio performance. When the obtained radio performance satisfies the preset radio performance, the processor 190 may select the second transmitting antenna 155-2 immediately adjacent to the first transmitting antenna 155-1 as the next antenna to be turned off.

The processor 190 turns off the first transmitting antenna 155-1 and the second transmitting antenna 155-2 and then obtain radio performance. When the obtained radio performance satisfies the preset radio performance, the processor 190 turns off the next transmitting antenna.

The processor 190 turns off the first transmitting antenna 155-1 and the second transmitting antenna 155-2 and, when the obtained radio performance does not satisfy the preset radio performance, turns on the second transmitting antenna 155-2. This is because the radio quality required for A/V data transmission is not satisfied.

FIG. 11 may show an embodiment in which the transmitting antennas are sequentially turned off along a second antenna path 1100 of a counterclockwise direction.

As such, according to an embodiment of the present disclosure, when the angle between the RF transmitting module 150 and the RF receiving module 240 forms a predetermined angle, the outermost transmitting antennas may be sequentially turned off to determine whether radio performance is satisfied.

Accordingly, the antenna that does not affect the radio transmission performance is turned off, thereby preventing consumption of power to be supplied to the turned-off antennas.

Figure 12:
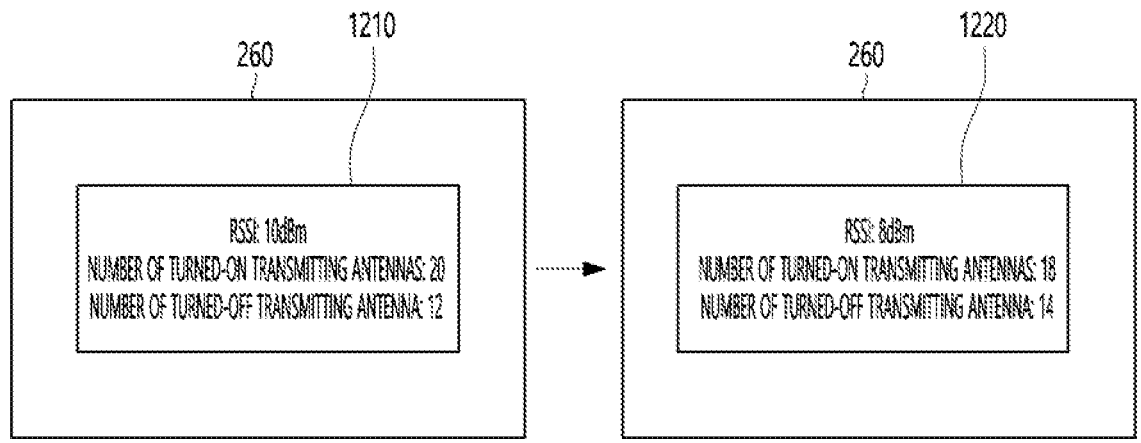
FIG. 12 illustrates an embodiment in which the number of turned-off transmitting antennas is changed according to measured RSSI.
Figure 12:
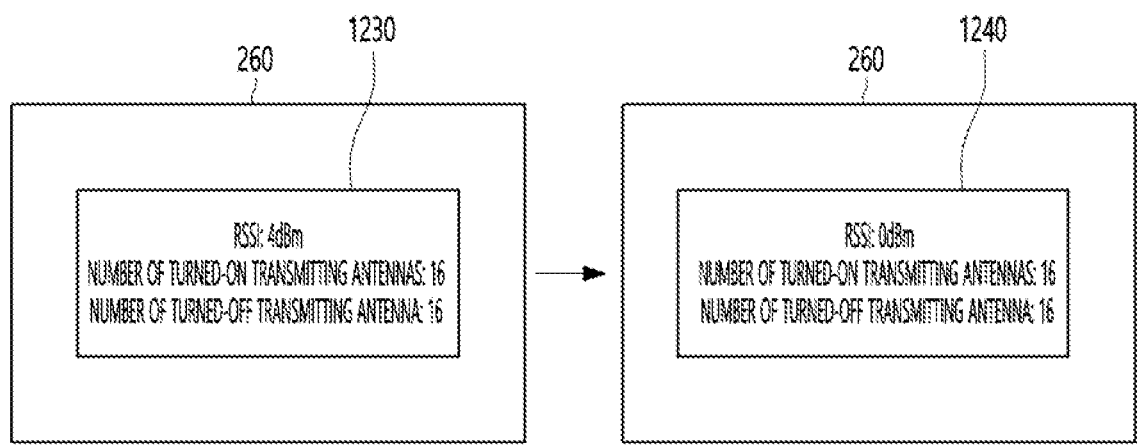

FIG. 12 is an embodiment showing that the number of turned-off transmitting antennas is changed according to the measured RSSI.

In FIG. 12, it is assumed that the preset radio performance has an RSSI of 5 dBm.

That is, when the RSSI is maintained at 5 dBm or more, the transmitting antennas may be sequentially turned off.

As the RSSI is changed, the display 260 of the A/V receiving device 200 may display the number of turned-on transmitting antennas and the number of turned-off transmitting antennas.

Specifically, a first user interface (UI) 1210 indicates that the RSSI is 10 dBm, the number of turned-on transmitting antennas is 20, and the number of turned-off transmitting antennas is 12.

The second UI 1220 indicates that the RSSI is 8 dBm, the number of turned-on transmitting antennas is 18, and the number of turned-off transmitting antennas is 14. That is, although the RSSI is reduced from 10 dBm to 8 dBm, since the RSSI is equal to or greater than the reference RSSI of 5 dBm, the number of turned-off transmitting antennas is increased from 12 to 14.

That is, when the radio transmission performance satisfies a predetermined level, power consumption may be reduced by turning off the transmitting antennas.

The third UI 1230 indicates that the RSSI is 4 dBm, the number of turned-on transmitting antennas is 16, and the number of turned-off transmitting antennas is 16. That is, the RSSI is 4 dBm, which is less than the reference RSSI of 5 dBm.

The fourth UI 1240 indicates that the RSSI is 0 dBm, the number of turned-on transmitting antennas is 16, and the number of turned-off transmitting antennas is 16. Since the RSSI is 4 dBm, which is less than the reference RSSI of 5 dBm, there is no change in the number of turned-off transmitting antennas. This is to ensure that A/V data is stably transmitted by maintaining the minimum radio quality.

In another embodiment, when the radio performance satisfies the preset radio performance, the process of turning off the transmitting antennas may be confirmed through a thermal imaging camera.

When the transmitting antennas are turned on and off, infrared energies of areas in which the transmitting antennas are disposed may be different from each other. In this manner, when the radio performance satisfies the preset radio performance and the transmitting antennas are sequentially turned off, a change in infrared energy may be observed through the thermal imaging camera.

According to an embodiment of the present disclosure, the above-described method may be implemented with codes readable by a processor on a medium in which a program is recorded. Examples of the medium readable by the processor include a ROM (Read Only Memory), a Random Access Memory (RAM), a CD-ROM, a magnetic tape, a floppy disk, an optical data storage device, and the like.

The A/V transmitting device described above is not limitedly applicable to the configuration and method of the above-described embodiments, and the embodiments are configured by selectively combining all or part of each of the embodiments such that various modifications can be made.

What is claimed is:

1. An Audio/Video (A/V) transmitting device comprising:
a Radio Frequency (RF) transmitting module configured to transmit a compressed RF packet to an RF receiving module of an A/V receiving device, the RF transmitting module including a plurality of transmitting antennas; and
a processor configured to obtain radio performance between the RF transmitting module and the RF receiving module and, when the obtained radio performance satisfies a preset radio performance, sequentially turn off one or more transmitting antennas among the plurality of transmitting antennas,
wherein the obtained radio performance includes a Received Signal Strength Indicator, RSSI,
wherein the processor is configured to turn off a first transmitting antenna among the plurality of transmitting antennas and obtain a second radio performance and, when the obtained second radio performance satisfies the preset radio performance, to turn off a second transmitting antenna among the plurality of transmitting antennas.

2. The A/V transmitting device of claim 1, wherein the obtained radio performance includes a Signal-to-Noise (SNR).

3. The A/V transmitting device of claim 1, wherein the processor turns off the first and second transmitting antennas and obtains a third radio performance and, when the obtained third radio performance does not satisfy the preset radio performance, turns on the second transmitting antenna among the plurality of transmitting antennas.

4. The A/V transmitting device of claim 1, wherein the plurality of transmitting antennas are arranged in a matrix structure.

5. The A/V transmitting device of claim 1, wherein the RF transmitting module further includes an RF IC (integrated circuit) chip including a plurality of RF IC elements configured to transmit an on or off signal to each of the plurality of transmitting antennas.

6. The A/V transmitting device of claim 1, wherein when the RSSI is maintained at a preset value, the processor is configured to sequentially turn off a preset number of the transmitting antennas.

7. The A/V transmitting device of claim 1, wherein when the RSSI is equal to or greater than a reference RSSI value, the processor is configured to sequentially turn off a preset number of the transmitting antennas.

8. An operating method of an Audio/Video, A/V, transmitting device transmitting a compressed Radio Frequency, RF, packet to an RF receiving module of an A/V receiving device, the RF transmitting module includes a plurality of transmitting antennas, the method comprises:

obtaining radio performance between the RF transmitting module and the RF receiving module, and when the obtained radio performance satisfies a preset radio performance, sequentially turning off one or more transmitting antennas among the plurality of transmitting antennas, wherein the obtained radio performance includes a Received Signal Strength Indicator, RSSI; and turning off a first transmitting antenna among the plurality of transmitting antennas and obtaining a second radio performance and, when the obtained second radio performance satisfies the preset radio performance, turning off a second transmitting antenna among the plurality of transmitting antennas.

9. The method of claim 8, wherein the radio performance includes a Signal-to-Noise, SNR.

10. The method of claim 8, wherein the method further comprises:

turning off the first and second transmitting antennas and obtain a third radio performance, and when the obtained third radio performance does not satisfy the preset radio performance, turning on the second transmitting antenna among the plurality of transmitting antennas.

11. The method of claim 8, wherein the plurality of transmitting antennas are arranged in a matrix structure.

12. The method of claim 8, wherein when the RSSI is maintained at a reference RSSI value, sequentially turning off a preset number of the transmitting antennas.

13. The method of claim 8, wherein when the RSSI is equal to or greater than a reference RSSI value, sequentially turning off a preset number of the transmitting antennas.

* * * * *